United States Patent [19]

Dhyanchand

[11] Patent Number: 5,055,700
[45] Date of Patent: Oct. 8, 1991

[54] BRUSHLESS GENERATOR HAVING PRIME MOVER START CAPABILITY

[76] Inventor: P. John Dhyanchand, 2721 Pelham Rd., Rockford, Ill. 61107

[21] Appl. No.: 421,640

[22] Filed: Oct. 16, 1989

[51] Int. Cl.⁵ ............................................. F02N 11/04
[52] U.S. Cl. ...................................................... 290/31
[58] Field of Search ....................... 290/10, 22, 31, 46; 322/10, 29

[56] References Cited

U.S. PATENT DOCUMENTS

| | | |
|---|---|---|
| 3,793,546 | 2/1974 | King, Jr. ............................... 310/183 |
| 3,809,914 | 5/1974 | Kilgore et al. ......................... 290/38 |
| 3,908,161 | 9/1975 | Messenger .............................. 322/29 |
| 4,329,609 | 5/1982 | Allegre et al. ........................ 310/183 |
| 4,743,776 | 5/1988 | Baehler et al. ......................... 290/31 |
| 4,743,777 | 5/1988 | Shilling et al. ......................... 290/46 |
| 4,830,412 | 5/1989 | Raad et al. .............................. 290/31 |
| 4,883,973 | 11/1989 | Lakey et al. ............................ 290/31 |

*Primary Examiner*—A. D. Pellinen
*Assistant Examiner*—W. E. Duncanson, Jr.

[57] ABSTRACT

A brushless generator which is operable in a generating mode to convert motive power into electrical power, and in a starting mode to convert electrical power into motive power includes a set of electrically conductive bars disposed on a rotor of the generator and which are interconnected to form a squirrel cage winding whereby AC power may be provided to a main generator portion armature winding which induces currents in the bars and causes the generator to operate as an induction motor. Circuitry is provided for periodically shorting a main field winding of the generator during operation of the generator in the starting mode to prevent damage thereto.

10 Claims, 3 Drawing Sheets

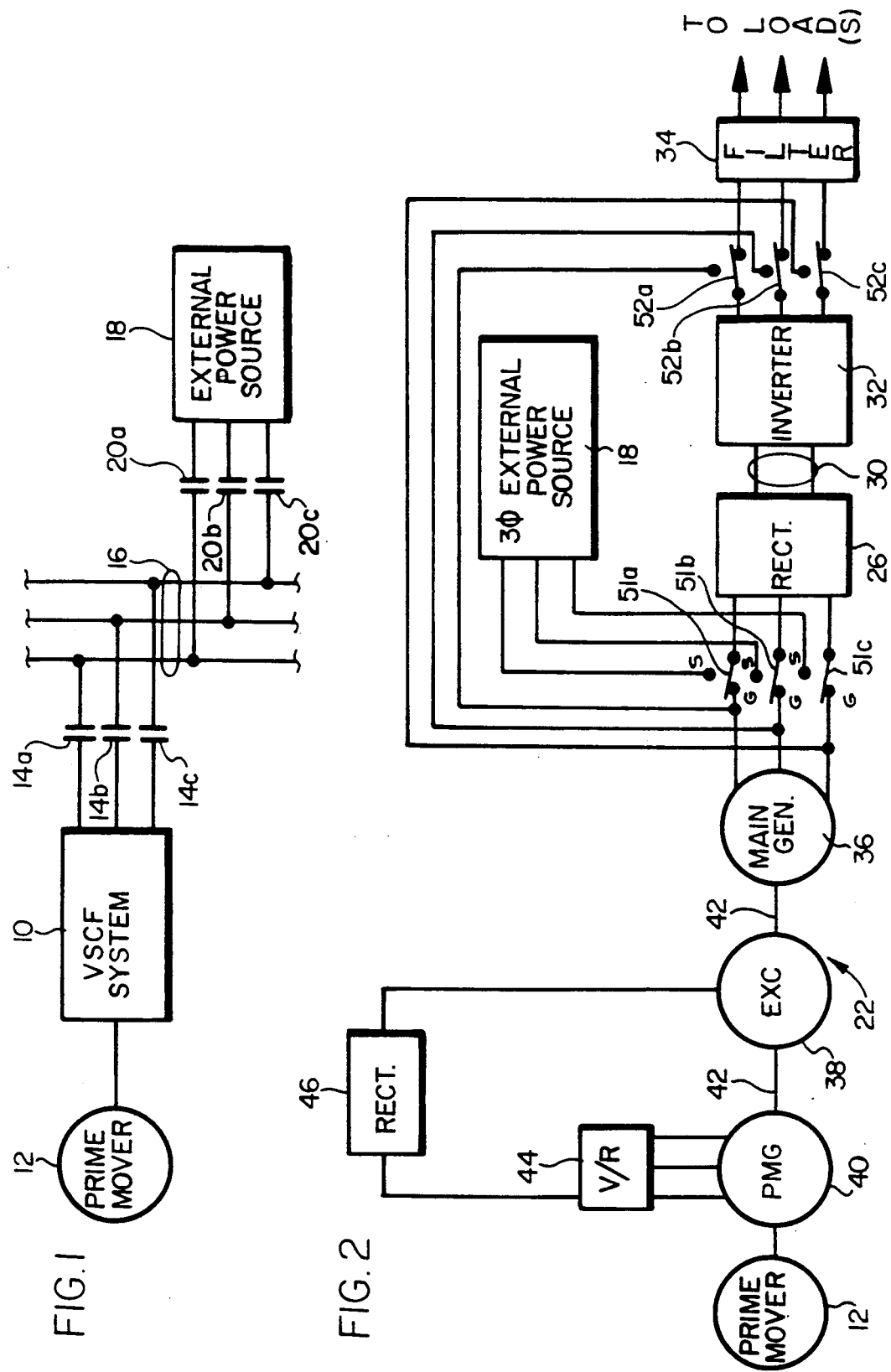

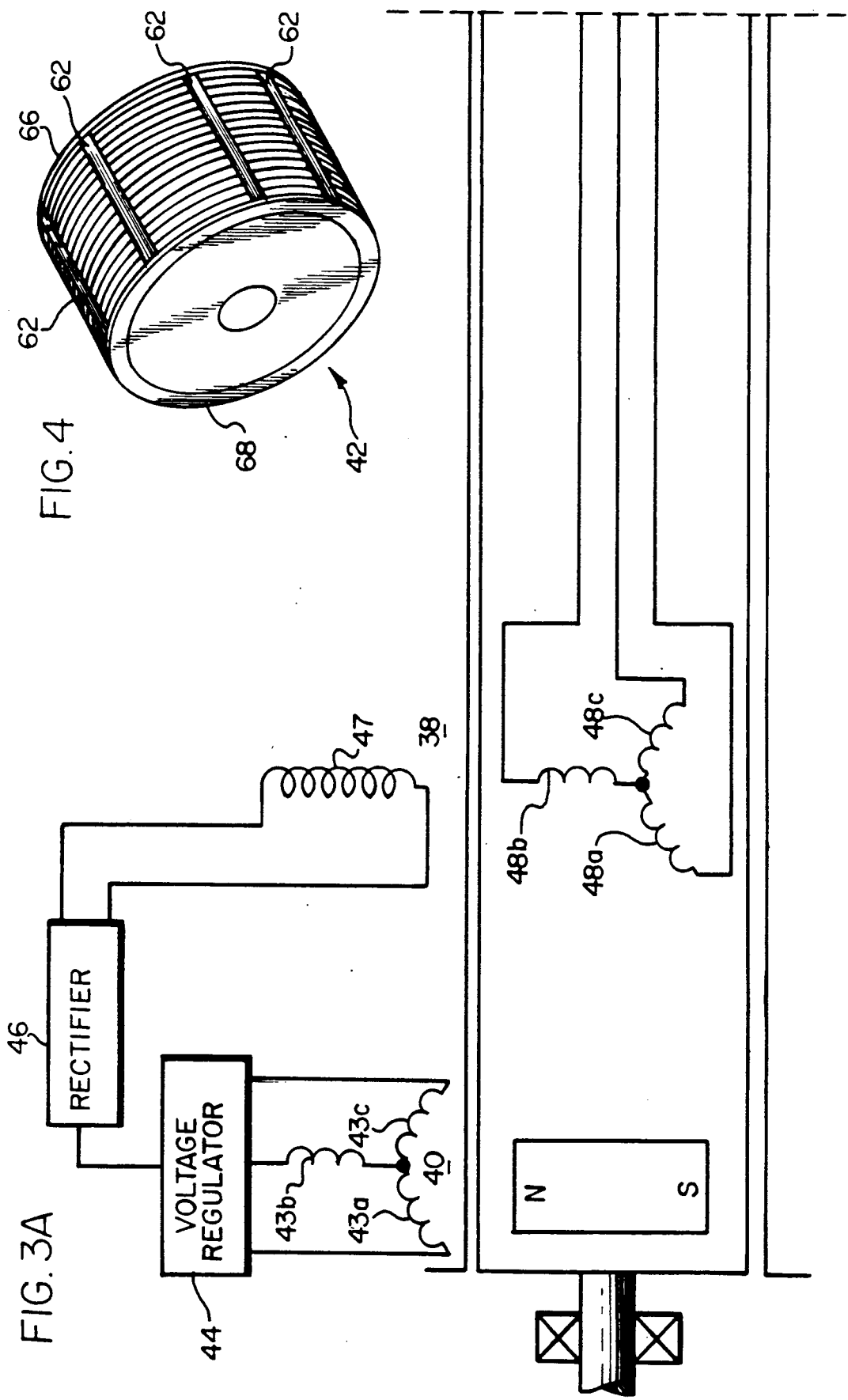

BRUSHLESS GENERATOR HAVING PRIME MOVER START CAPABILITY

TECHNICAL FIELD

The present invention relates generally to brushless generators, and more particularly to brushless generators which may be used in a generating mode to convert mechanical power into electrical power or in a starting mode to convert electrical power into motive power for starting a prime mover.

BACKGROUND ART

In a variable speed, constant frequency (VSCF) power generating system, a brushless, synchronous generator is supplied variable speed motive power by a prime mover and develops variable frequency AC power at an output thereof. The variable frequency power is rectified and provided over a DC link to a controllable static inverter. The inverter is operated to produce constant frequency AC power, which is then supplied over a load bus to one or more loads.

As is known, a generator can be operated as a motor in a starting mode to convert electrical power supplied by an external AC power source into motive power which may in turn be provided to the prime mover to bring it up to self-sustaining speed. In the case of a brushless, synchronous generator having a permanent magnet generator (PMG), an exciter portion and a main generator portion mounted on a common shaft, it has been known to provide power at a controlled voltage and frequency to the armature windings of the main generator portion and to provide field current to the main generator portion via the exciter portion so that the motive power may be developed. This has been accomplished in the past using two separate inverters, one to provide power to the main generator portion armature windings and the other to provide power to the exciter portion.

Shilling, et al., U.S. Pat. No. 4,743,777 discloses a starter generator system using a brushless, synchronous generator. The system is operable in a starting mode to produce motive power from electrical power provided by an external AC power source. An exciter of the generator includes separate DC and three-phase AC field windings disposed in a stator. When operating in a starting mode at the beginning of a starting sequence, the AC power developed by the external AC power source is directly applied to the three-phase AC exciter field windings. The AC power developed by the external AC source is further provided to a variable voltage, variable frequency power converter which in turn provides a controlled voltage and frequency to armature windings of a main generator. The AC power provided to the AC exciter field windings is transferred by transformer action to exciter armature windings disposed on a rotor of the generator. This AC power is rectified by a rotating rectifier and provided to a main field winding of the generator. The interaction of the magnetic fields developed by the main generator field winding and armature windings in turn causes the rotor of the generator to rotate and thereby develop the desired motive power. When the generator is operated in a generating mode, switches are operated to disconnect the AC exciter field windings from the external AC source and to provide DC power to the DC exciter field winding.

One disadvantage of the system disclosed in Shilling, et al., is that separate AC and DC exciter field windings are required, thus adding to the overall size and weight of the generator. In VSCF systems used in aircraft, this increase in size and weight is considered undesirable and may even render the power system unsuitable for such use.

Messenger, U.S. Pat. No. 3,908,161 discloses a brushless generator including three exciter field windings which are connected in a wye configuration and provided three-phase AC power during operation in a starting mode. The three-phase AC power induces AC power in an exciter armature winding which is rectified and applied to a main generator field winding. Main armature windings receive controlled AC power to in turn cause rotation of the generator rotor. Thereafter, the three exciter field windings are connected in series and provided DC excitation when operating in a generating mode.

Kilgore, et al., U.S. Pat. No. 3,809,914 discloses a starting system for a prime mover. An exciter of a slip ring generator driven by the prime mover is operated as a slip ring induction motor in response to the application of external AC power thereto. Specifically, the generator includes a three-phase exciter field winding which is provided AC power during starting. Also during starting, a control is connected through slip rings to a three-phase exciter armature winding which is disposed on a rotor of the generator. The current flowing in the exciter armature winding is controlled to cause the exciter to develop motive power which is transferred to the prime mover to bring it up to self-sustaining speed.

Raad, U.S. Pat. Application Ser. No. 112,701, filed Nov. 30, 1987, entitled "Starting System and Method Using a Hybrid Permanent Magnet/Induction Machine" and assigned to the assignee of the present application discloses a hybrid electromagnetic machine which includes a series of bars disposed on a permanent magnet structure of a rotor and connected to a squirrel cage winding. The machine is operated as an induction motor in a starting mode until a synchronous speed of the machine is reached, following which the machine is operated as a synchronous motor. During operation as an induction motor, AC power is applied to main generator armature windings which in turn induces AC currents in the squirrel cage winding. The magnetic fields developed by these currents interact to cause rotation of the rotor.

King, Jr., U.S. Pat. No. 3,793,546, and Allegre, et al., U.S. Pat. No. 4,329,609 disclose the use of damper bars in an electromagnetic machine.

SUMMARY OF THE INVENTION

In accordance with the present invention, a brushless generator is provided with apparatus and circuitry to allow prime mover starting.

More particularly, a brushless generator operable in a generating mode to convert motive power into electrical power and in a starting mode to convert electrical power into motive power includes a set of electrically conductive bars disposed on a rotor of the generator which are interconnected to form a squirrel cage winding. During operation in the starting mode, AC power is provided to an armature winding of a main generator portion of the generator, such AC power inducing currents in the bars which, in turn, cause the generator to operate as an induction motor. Means are also provided for periodically shorting a main field winding of the generator during operation in the starting mode to prevent damage to insulation caused by high voltages. In the preferred embodiment, such means comprises a semiconductor switching element which is mounted on the rotor and operated by an oscillator which is stationary with respect to a stator of the generator. The oscillator output is provided to the semiconductor switching element by a rotary pulse transformer.

The brushless generator of the present invention does not require multiple exciter field windings, an exciter inverter to permit operation in the starting mode or a position sensor for providing rotor position feedback. Further, the starting capability is obtained through the addition of only a few components which do not add significantly to the size and weight of the overall generator.

BRIEF DESCRIPTION OF THE DRAWINGS

FIG. 1 is a block diagram of a power generating system;

FIG. 2 comprises a combined mechanical and electrical block diagram of the power generating system shown in FIG. 1;

FIGS. 3A and 3B, when paired along the dashed lines, together comprise a combined mechanical block diagram and electrical schematic diagram of the brushless generator of the present invention, together with the rectifier and inverter illustrated in FIG. 2; and FIG. 4 is a perspective view of the rotor of FIG. 3, shown in simplified form.

DESCRIPTION OF THE PREFERRED EMBODIMENT

Figure 3B:
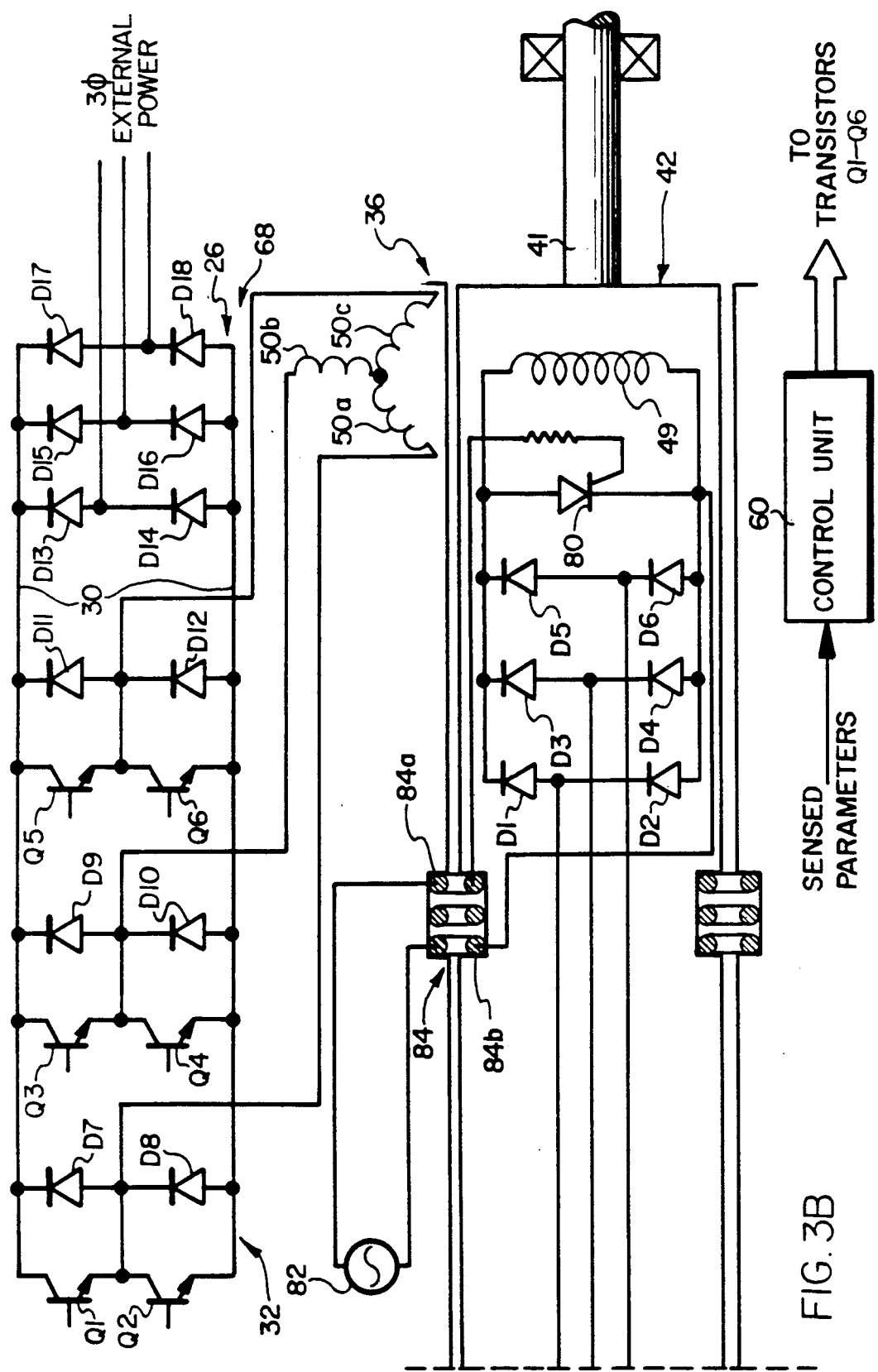

Referring now to FIG. 1, a variable speed, constant frequency (VSCF) system 10 operates in a generating mode to convert variable speed motive power produced by a prime mover 12, such as an aircraft jet engine, into constant frequency AC electrical power which is delivered through controllable contactors 14a, 14b, 14c to a load bus 16. The VSCF system 10 is also operable in a starting mode using electrical power provided by an external power source 18, such as a ground power cart, which is in turn coupled to the load bus 16 through controllable contactors 20a-20c. Alternatively, the electrical power for use by the VSCF system 10 in the starting mode may be provided by another source of power, such as another VSCF system which is driven by a different prime mover. In any event, the VSCF system 10 converts electrical power into motive power when operating in the starting mode to bring the prime mover 12 up to self-sustaining speed. Once this self-sustaining speed (also referred to as "light-off") is reached, the prime mover 12 may be accelerated to operating speed, following which operation in the generating mode may commence.

Referring now to FIG. 2, the VSCF system 10 includes a brushless, synchronous generator 22 driven by the prime mover 12. During operation in the generating mode, the generator 22 develops polyphase, variable frequency AC power which is converted into DC power by a rectifier/filter 26. The resulting DC power is provided over a DC link 30 to a polyphase inverter 32 which converts the DC power into three-phase, constant frequency AC power. This AC power may be filtered by an optional filter 34 and is provided via the set of controllable contactors 14a-14c to the load bus 16.

Referring also to FIGS. 3A and 3B, the generator 22 includes a main generator portion 36, an exciter portion 38 and a permanent magnet generator (PMG) 40, all of which include rotor structures mounted on a common shaft 41 of a rotor 42. In the generating mode of operation, rotation of the common shaft 41 in turn causes polyphase power to be developed in armature windings 43a–43c, FIG. 3A, of the PMG 40 which is in turn delivered to a voltage regulator 44. The voltage regulator 44 and a rectifier 46 deliver a controlled magnitude of DC current to a field winding of the exciter 38. This current induces an AC voltage in armature windings 48a–48c of the exciter 38 which is rectified by a rotating rectifier, comprising diodes D1–D6, FIG. 3B. The resulting DC power is supplied to a field winding 49 of the main generator 36. Rotation of the common shaft 41 while the field current is flowing in the field winding 49 of the main generator portion 36 causes polyphase voltages to be developed in armature windings 50a–50c of the main generator portion 36. As seen specifically in FIG. 2, these voltages are supplied through contactor sets represented by single-pole, two-throw switches 51a–51c to the rectifier 26. Also during operation in the generating mode, a set of contactors represented by single-pole, two-throw switches 52a–52c connects the output of the inverter 32 to the filter 34 so that the AC power is provided to the load bus 16. It should be noted that the contactors 14a–14c and 20a–20c are not shown in FIGS. 2 and 3 for clarity.

Also, it should be noted that the PMG armature windings 43a–43c, exciter field winding 47 and main generator portion armature windings 50a–50c are disposed in a stator 54 of the generator 22.

During operation in the starting mode, the contactor sets represented by the switches 51a–51c and 52a–52c are moved to the positions opposite those shown in FIG. 2 so that the external AC power source 18 is coupled to the input of the rectifier 26 and the output of the inverter 32 is coupled to the armature windings 50a–50c of the main generator 36. The switches Q1–Q6 of the inverter 32 are operated by a control unit 60 to provide AC power at a constant volts-per-hertz ratio to the main generator portion armature windings 50a–50c. The application of power at constant volts-per-hertz ratio prevents undesirable saturation of the stator magnetics 50a–50c.

As seen specifically in the simplified representation of the rotor 42 illustrated in FIG. 4, a series of electrically conductive damper bars 62 extend axially of the rotor 42 and are mechanically and electrically interconnected by electrically conductive end rings 64,66. The damper bars 62 and end rings 64,66 may be fabricated of copper or any other electrically conductive material. The damper bars 62 and end rings 64,66 together comprise a squirrel cage winding for the rotor 42. The application of the constant volts-per-hertz power to the armature windings 50a–50c of the main generator portion 36 in turn causes currents to be induced in the damper bars 62 and end rings 64,66. These currents produce a magnetic field which interacts with the magnetic field established by the currents flowing in the main generator portion armature windings 50a–50c to cause the rotor 42 to rotate relative to a stator 68 of the generator 22 and thereby produce motive starting power. The generator 22 thus functions as an induction motor to permit starting of the prime mover.

In order to prevent damage to the main generator portion field winding 49 during operation in the starting mode, means are provided for periodically shorting out same to prevent the buildup of a large magnitude voltage which would result in insulation breakdown. Such means, in the preferred embodiment, comprises a semiconductor switching element in the form of a silicon controlled rectifier (SCR) 80 having main current path electrodes connected in parallel across the winding 49. The SCR 80 is controlled by an oscillator 82 which is stationary with respect to the stator 68. The oscillator 82 is coupled to a gate electrode of the SCR 80 by means of a rotary pulse transformer 84 having primary windings 84a coupled to the oscillator 82 and secondary windings 84b coupled between the gate electrode of the SCR 80 and one of the main current path electrodes thereof, such as the cathode.

If desired, the SCR 80 may be replaced by a different switching element, such as an insulated gate bipolar transistor (IGBT), a MOS controlled thyristor (MCT) or the like.

It should be noted that the frequency of the oscillator 82 should be selected to be sufficiently high to prevent the generation of a significant voltage across the main generator portion field coil 49. Also, the oscillator frequency should be sufficiently high to permit the use of a small pulse transformer which does not add significantly to the weight of the generator.

The oscillator 82 may be controlled by the control unit 60 or another circuit such that the oscillator 82 is on when operating in the starting mode and off when operating in the generating mode. Alternatively, the oscillator may be continuously on and connectable to the primary winding 84a of the rotary transformer 84 by means of a switch (not shown) which is manually operated or operated by the control unit 60 or another circuit.

The control unit 60 continues to operate the inverter 32 in the starting mode to in turn accelerate the rotor 42 until a particular rotor speed indicative of the prime mover 12 reaching self-sustaining speed is attained. Thereafter, the external power source 18 may be disconnected from the rectifier 26 and the inverter may be connected to the filter 34 by moving the switches 51a-51c and 52a-52c to the positions shown in FIG. 2. Concurrently, the oscillator 82 may be deactivated or disconnected from the SCR 80 so that the periodic shorting of the main generator portion field coil 49 is terminated. Subsequently, once the prime mover 12 has accelerated to operating speed, the inverter switches 32 may be operated in the generating mode to produce constant frequency output power which is delivered to the filter 34 and the load bus 16.

The design of the control unit 60 is straightforward and may be implemented in whole or in part by software or hardware, as desired.

The brushless generator of the present invention does not require an exciter inverter to accomplish operation in the starting mode. Rather, the generator requires only the addition of a semiconductor switch on the rotor, a rotary pulse transformer and an oscillator. If the frequency of the oscillator is maintained at a high value, the rotary transformer may be made relatively small, and hence the generator may be only marginally larger and heavier than a generator which does not include the ability to operate in the starting mode.

I claim:

1. A brushless generator operable in a generating mode to convert motive power into electrical power and in a starting mode to convert electrical power into motive power wherein the generator includes an exciter portion having an armature winding disposed on a rotor of the generator and a field winding disposed in a stator of the generator and further including a main generator portion having a main field winding disposed on the rotor and an armature winding disposed in the stator, comprising:

a set of electrically conductive bars disposed on the rotor and interconnected to form a squirrel cage winding whereby AC power is provided to the armature winding of the main generator portion which induces currents in the bars and causes the generator to operate as an induction motor; and means for periodically shorting the main field winding during operation of the generator in the starting mode.

2. The brushless generator of claim 1, wherein the shorting means comprises a semiconductor switching element mounted on the rotor.

3. The brushless generator of claim 2, wherein the shorting means comprises a silicon controlled rectifier.

4. The brushless generator of claim 2, wherein the shorting means further includes means stationary with respect to the stator for controlling the semiconductor switching element.

5. The brushless generator of claim 4, wherein the controlling means comprises an oscillator.

6. The brushless generator of claim 5, wherein the oscillator is coupled to the switching element by a rotary pulse transformer.

7. The brushless generator of claim 1, further including means for delivering AC power to the main portion armature winding at a constant volts-per-hertz ratio during operation in the starting mode.

8. A brushless generator operable in a generating mode to convert motive power into electrical power and in a starting mode to convert electrical power into motive power wherein the generator includes an exciter portion having an armature winding disposed on a rotor of the generator and a field winding disposed in a stator of the generator and further including a main generator portion having a main field winding disposed on the rotor and a set of armature windings disposed in the stator, comprising:

a set of electrically conductive damper bars disposed on the rotor and interconnected to form a squirrel cage winding;

a semiconductor switching element disposed on the rotor and coupled across the main field winding;

a source of AC power operable in the starting mode to provide AC power at a constant volts-per-hertz ratio to the set of armature windings of the main generator portion whereby the AC power causes the generator to operate as an induction motor; and an oscillator coupled to the switching element and operable in the starting mode to cause the switching element to periodically short out the main field winding.

9. The brushless generator of claim 8 wherein the oscillator is coupled to the switching element by a rotary pulse transformer.

10. The brushless generator of claim 9, wherein the switching element comprises a silicon controlled rectifier.

* * * * *